(12) United States Patent
Sanders et al.

(10) Patent No.: US 8,997,323 B1
(45) Date of Patent: Apr. 7, 2015

(54) TOOL FOR REMOVAL AND REPLACEMENT OF SPRINKLER HEADS

(76) Inventors: James R. Sanders, Amarillo, TX (US); C. Duane Sanders, Amarillo, TX (US)

(*) Notice: Subject to any disclaimer, the term of this patent is extended or adjusted under 35 U.S.C. 154(b) by 436 days.

(21) Appl. No.: 13/506,582

(22) Filed: May 1, 2012

(51) Int. Cl.
*B23P 11/00* (2006.01)
*B65G 65/00* (2006.01)
*B66F 7/06* (2006.01)

(52) U.S. Cl.
CPC ...... *B65G 65/00* (2013.01); *B65H 2301/42254* (2013.01); *B65H 2301/42256* (2013.01); *B66F 7/0633* (2013.01)

(58) Field of Classification Search
CPC .................................. B25B 27/00; B25B 9/00
USPC ..................... 29/255–263, 265–282
See application file for complete search history.

(56) References Cited

U.S. PATENT DOCUMENTS

| | | | | | |
|---|---|---|---|---|---|
| 3,862,483 | A | * | 1/1975 | Kloster | 29/257 |
| 4,009,515 | A | * | 3/1977 | Racin | 29/265 |
| 4,059,883 | A | * | 11/1977 | Osborne | 29/259 |
| 4,904,010 | A | * | 2/1990 | Lacey et al. | 294/116 |
| 8,256,081 | B2 | * | 9/2012 | Fridman | 29/255 |
| 8,468,667 | B2 | * | 6/2013 | Straubinger et al. | 29/237 |
| 2004/0088844 | A1 | * | 5/2004 | Klann | 29/263 |

* cited by examiner

*Primary Examiner* — Lee D Wilson
(74) *Attorney, Agent, or Firm* — Norman B. Rainer

(57) ABSTRACT

A hand manipulatable tool for removing and replacing sprinkler heads threadably connected to an underground watering system employs a straight metal pipe component having outwardly flared portions at both extremities adapted to grip the sprinkler heads. A straight handle rod interactive with the pipe component facilitates unscrewing and lifting of the gripped sprinkler head.

11 Claims, 2 Drawing Sheets

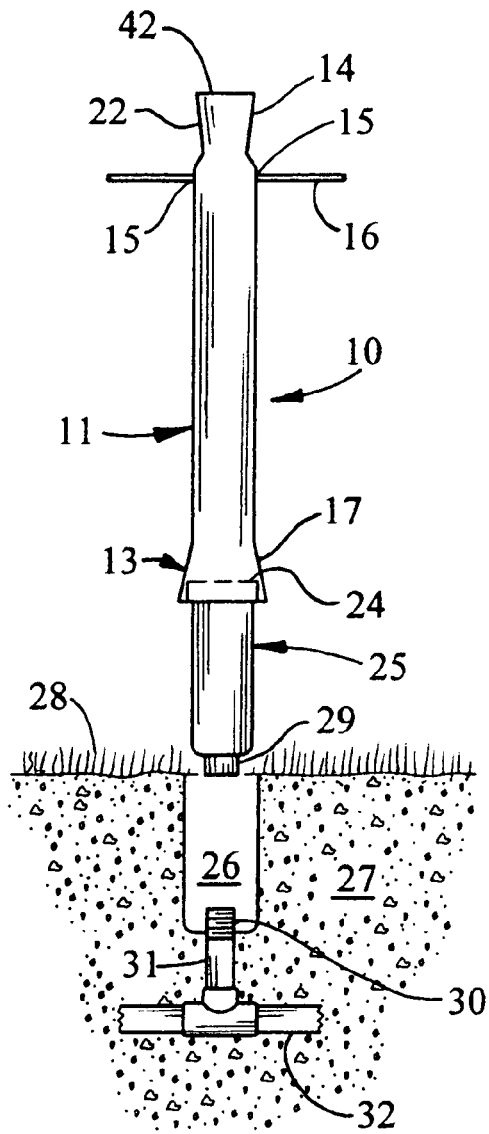
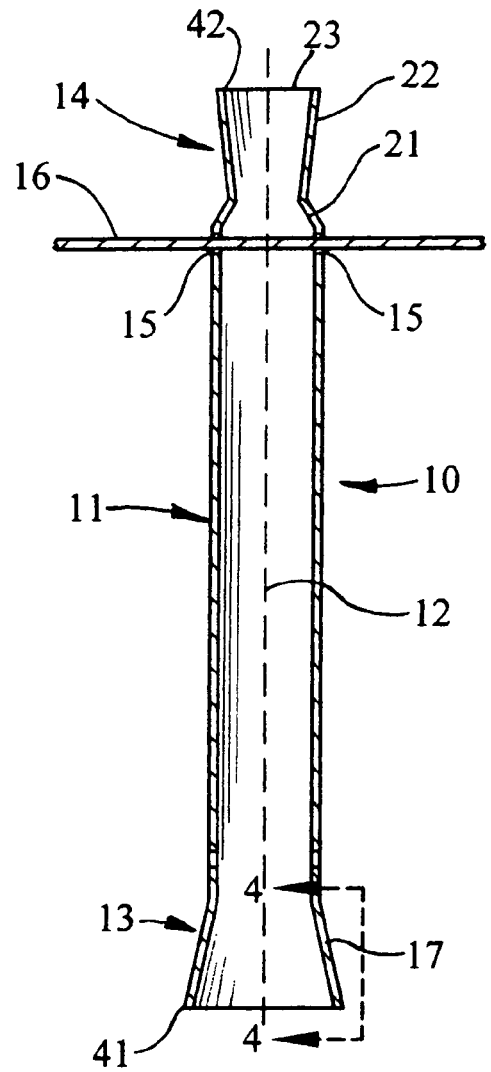
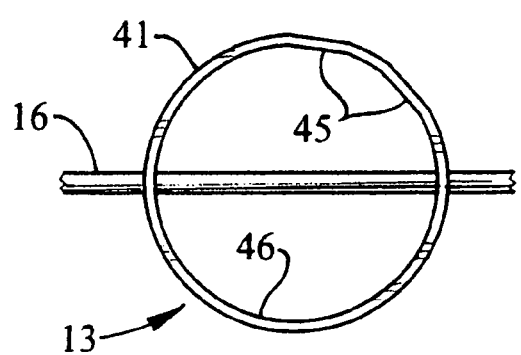
FIG. 1
FIG. 2
FIG. 3

TOOL FOR REMOVAL AND REPLACEMENT OF SPRINKLER HEADS

BACKGROUND OF THE INVENTION

1. Field of the Invention

This invention relates to the servicing of underground watering systems, and more particularly concerns a hand tool for the removal and replacement of sprinkler head components of underground systems for lawn watering.

2. Description of the Prior Art

Underground watering systems are commonly utilized for accurately and controllably spraying water onto grass lawns. Such systems are comprised of plastic supply pipes arranged as a substantially horizontal network installed about one to two feet below the lawn. At strategic intervals and locations, riser pipes are vertically emergent from the supply pipes, and terminate in male threaded extremities.

A sprinkler head is attached to the upper extremity of each riser pipe. The sprinkler head is comprised of a cylindrical housing, generally of plastic construction, having a centered bottom female threaded collar aperture adapted to screw onto the threaded upper extremity of the riser pipe. A removable spring-actuated internal cartridge is seated within the cylindrical housing, and is secured therein by external threading on the upper extremity of the housing. The upper extremity of said cartridge has a circular rim having peripheral apertures for the radial distribution of water. Said rim is operationally positioned at an elevation adjacent the root line of the grass.

In the course of foot and/or vehicle traffic upon the lawn, and mowing maintenance, sprinkler heads become damaged, and often require replacement. U.S. Pat. No. 4,788,894 to Mitschele discloses a hand tool for removing sprinkler heads from underground watering systems. Mitschele's tool is comprised of a hollow encasement dimensioned to embrace the entire length of the sprinkler head while also engulfing surrounding soil. The encasement containing the sprinkler head is then twisted, causing the engulfed soil to compressively grip the housing member of the sprinkler head. Further twisting causes the sprinkler head to unthreadably detach from the underlying riser pipe to permit upward removal. Such action leaves an empty hole in the ground.

Although the Mitschele tool may perform properly with permissive soil texture and moisture, removal of the compressed soil from the encasement is difficult. Even more difficult is the return of the removed soil to the hole to facilitate proper seating of a replacement sprinkler head while preventing soil from entering the open upper extremity of the riser pipe. Also, Mitschele makes no provision for accurately aligning a replacement sprinkler head for threadable engagement with the upper extremity of the riser pipe.

Accordingly, it is an object of the present invention to provide a tool for the removal and replacement of a sprinkler head component of an underground watering system.

It is another object of this invention to provide a tool as in the foregoing object which can be hand-manipulated.

It is a further object of the present invention to provide a tool of the aforesaid nature which does not require removal of surrounding soil to achieve removal of a sprinkler head.

It is an additional object of this invention to provide a tool of the aforesaid nature having means for aligning a replacement sprinkler head for proper threaded installation upon an underlying riser pipe.

It is a still further object of the present invention to provide a tool of the aforesaid nature adaptable to use with sprinkler heads of various diameter.

It is yet another object of this invention to provide a tool of the aforesaid nature which is easily maintainable, durably constructed and amenable to low cost manufacture.

These objects and other objects and advantages of the invention will be apparent from the following description.

SUMMARY OF THE INVENTION

The above and other beneficial objects and advantages are accomplished in accordance with the present invention by a hand manipulatable tool for removing and replacing the sprinkler head of an underground watering system, said sprinkler head having an uppermost circular top rim, said tool comprising:

1) a metal pipe component extending on a straight center axis between large and small open gripping extremities, and having at least one pair of diametrically opposed apertures, each gripping extremity having an outwardly flared portion adapted to engage variously sized circular top rims of sprinkler heads, said engagement being sufficiently strong to permit rotation and lifting of said sprinkler head, and 2) a straight handle rod adapted to penetrate said apertures to facilitate rotation of said pipe about said axis and lifting of said tool with an engaged sprinkler head.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the tool of the present invention shown in operative association with a sprinkler head of an underground watering system.

FIG. 2 is an enlarged vertical sectional view of the embodiment of FIG. 1.

FIG. 3 is an enlarged bottom view of the embodiment of FIG. 2.

DESCRIPTION OF THE PREFERRED EMBODIMENT

Figure 6:
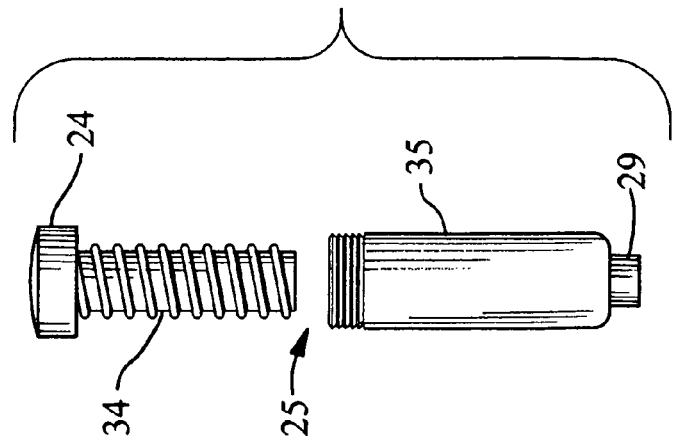
FIG. 6 is an exploded side view of the sprinkler head of FIG. 1.

Referring now to FIGS. 1-5, an embodiment of the sprinkler head removing tool 10 of this invention is shown comprised of a metal pipe component 11 of monolithic construction extending upon a straight center axis 12 between large and small open gripping extremities 13 and 14, respectively. At least one pair of diametrically opposed apertures 15 slidably accommodate a straight rod handle 16.

In the illustrated embodiment, pipe 11 has an overall length between 27 and 32 inches, and an inside diameter of about 2" inches. Rod handle 16 has a diameter of about ½" and a length of 12 to 14 inches. Both the large and small gripping extremities have outwardly flared, substantially conically shaped portions 17 and 22 respectively, terminating in circular perimeter edges 41 and 42, respectively. Such flared structure is the result of high force insertion of a substantially conical shaping mandrel into the extremities of pipe 11, causing controlled expansion of said perimeter edges. The interior surface 46 of each flared portion preferably contains gripping features capable of frictionally securing the circular plastic upper rim 24 of a typical sprinkler head 25.

The present invention is based in part upon the discovery that effective gripping features can be in the form of discontinuities in the otherwise symmetrical circular cross section of the flared portions. Preferred discontinuities are in the form of axially elongated intrusions 45 integral with the interior surface 46 of the flared portions and projecting inwardly toward said axis by an amount equal to about 1%-2% of said inside circular diameter. At least two such intrusions are preferred in spaced apart relationship. In a particularly preferred embodiment, a first intrusion, having a width of about 5% of the circumference of the circular cross section of the flared portion, is spaced apart by about 3% of said circumference from a second intrusion having a shape and dimensions comparable to said first intrusion. In preferred embodiments, the number and spacing of said intrusions is such as to occupy about 90° of the periphery of the flared portion. Said intrusions are produced by axially elongated flattened regions in a conically shaped mandrel which is forced into each extremity of pipe 11 for the purpose of producing said flared portions.

The conically shaped portion 17 of large gripping extremity 13 extends axially about 3.7 inches. Its associated circular perimeter edge 41 has an inside diameter of about 2⅜ inches, thereby defining a convergence angle A of about 5° relative to axis 12. Small gripping extremity 14 extends between circular perimeter edge 42, having an inside diameter of about 2⅛ inches, and an annular crimp depression 21 having been formed in a compression swage reduction operation. The distance of separation between edge 42 and depression 21 is about 3.7 inches, and defines a convergence angle A of about 6°. The overall effect of the two gripping extremities is to enable the handling of sprinkler heads whose circular rim diameters 24 range from 1¾" and 2⅜". The different convergence angles, which may range between 4° and 7°, provide versatility of gripping effectiveness. It has further been found that the gripping effectiveness is better when the tool is fabricated of iron rather than plastic.

In operation, as shown in FIG. 1, the tool of the present invention is vertically placed upon the circular rim 24 of sprinkler head 25 confined within hole 26 in the soil 27. Said circular rim is generally positioned at the root level of the lawn grass 28. A female threaded collar 29 centered within the bottom of said sprinkler head threadably engages the male threaded upper extremity 30 of riser pipe 31 emergent from supply line 32. With downward force, the gripping extremity secures the circular rim 24, and permits unthreading and lifting motions to remove the sprinkler head from hole 26 without disturbing the contour of the hole.

Figure 5:
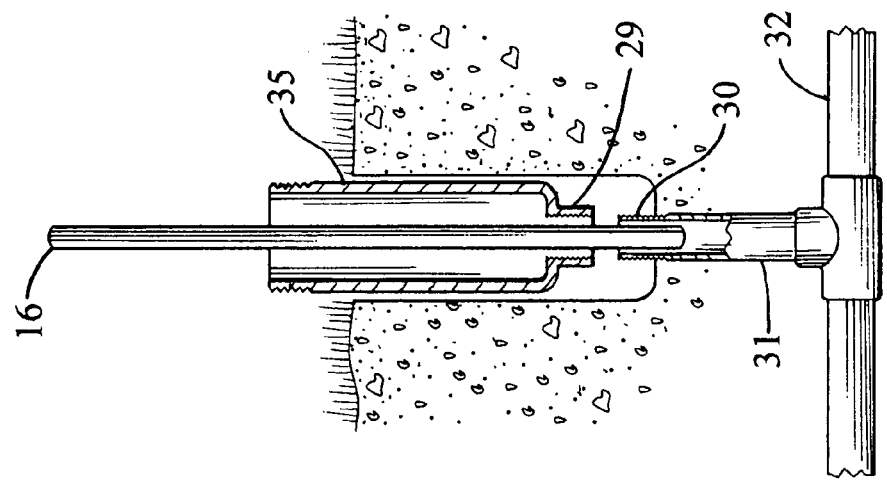
FIG. 5 is a sectional side view illustrating a secondary mode of function of the tool of the present invention.
Figure 4:
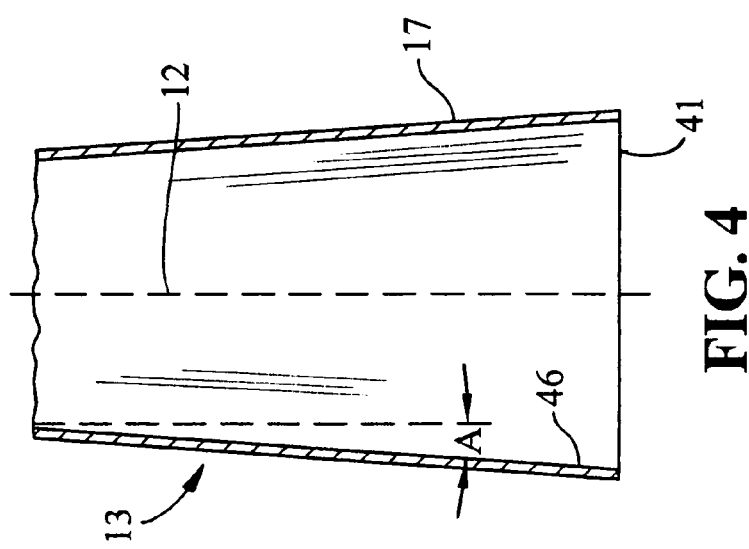
FIG. 4 is an enlarged vertical sectional side view of the large gripping extremity of the embodiment of FIG. 2.

A replacement sprinkler head can generally be installed simply by inserting it into the hole and twisting. However, in many instances there may be difficulties in precisely aligning the female threaded collar 29 on the bottom of the sprinkler head with the male threaded upper extremity 30 of the riser pipe. In such instances, a typical sprinkler head, constructed as shown in FIG. 6, is dismantled by unthreading and removing the center cartridge 34 from housing component 35. Then, as shown in FIG. 5, rod handle 16, removed from pipe 11, is inserted downwardly through said housing component and into riser pipe 31. Such action achieves the necessary alignment and securement of the involved threaded members. It also prevents entrance of dirt into the riser pipe. The rod handle is then removed and center cartridge 34 is re-threaded onto housing component 35. The aligned and intact sprinkler head is then twisted using the tool of this invention to complete the installation.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A hand manipulatable tool for removing and replacing the sprinkler head of an underground watering system, said sprinkler head having an uppermost circular top rim of plastic construction, said tool comprising:
   1) a monolithic pipe component extending on a straight center axis between large and small open gripping extremities, and having at least one pair of diametrically opposed apertures, each gripping extremity having an outwardly flared portion adapted to frictionally engage variously sized circular top rims of sprinkler heads, said engagement being sufficiently strong to permit rotation and lifting of said sprinkler head, and
   2) a straight handle rod adapted to removably penetrate said apertures to facilitate rotation of said pipe about said axis and lifting of said tool with an engaged sprinkler head.

2. The tool of claim 1 wherein said flared portions have substantially conical shapes having cross sections, taken orthogonally to said axis, which are substantially circular.

3. The tool of claim 2 wherein said conical configuration has a convergence angle between 4° and 7°.

4. The tool of claim 3 wherein said flared portions are bounded in part by an interior surface substantially symmetrically directed toward said axis.

5. The tool of claim 4 wherein said interior surface has discontinuities of form.

6. The tool of claim 5 wherein said discontinuities are axially elongated intrusions which extend inwardly toward said axis.

7. The tool of claim 6 wherein said intrusions extend inwardly toward said axis by an amount equal to about 1%-2% of the cross sectional diameter of said flared portions.

8. The tool of claim 6 having at least two of said discontinuities.

9. The tool of claim 1 capable of gripping said uppermost top rims having diameters between 1¾" and 2⅜".

10. The tool of claim 1 wherein said handle rod is of uniform circular cylindrical contour having a cross-sectional diameter of about ½" and a length between 12 and 14 inches.

11. The tool of claim 1 consisting of only two components, namely said pipe and rod.

* * * * *